(12) United States Patent
Bozon et al.

(10) Patent No.: US 10,494,111 B2
(45) Date of Patent: Dec. 3, 2019

(54) AIRCRAFT SUPPORT STRUCTURES, SYSTEMS, AND METHODS

(71) Applicant: LORD Corporation, Cary, NC (US)

(72) Inventors: Benjamin Bozon, Metz-Tessy (FR); Alexandre Kursner, Prangins (CH); Baptiste Narbon, Annecy le Vieux (FR); Daniel Zameroski, McKean, PA (US)

(73) Assignee: LORD Corporation, Cary, NC (US)

(*) Notice: Subject to any disclaimer, the term of this patent is extended or adjusted under 35 U.S.C. 154(b) by 105 days.

(21) Appl. No.: 15/756,365

(22) PCT Filed: Sep. 12, 2016

(86) PCT No.: PCT/US2016/051279
§ 371 (c)(1),
(2) Date: Feb. 28, 2018

(87) PCT Pub. No.: WO2017/048627
PCT Pub. Date: Mar. 23, 2017

(65) Prior Publication Data
US 2018/0244395 A1    Aug. 30, 2018

Related U.S. Application Data

(60) Provisional application No. 62/218,147, filed on Sep. 14, 2015.

(30) Foreign Application Priority Data

Sep. 16, 2015    (FR) ...................... 15 58715

(51) Int. Cl.
*B64D 27/26*    (2006.01)
*B64C 27/00*    (2006.01)
(Continued)

(52) U.S. Cl.
CPC ............ *B64D 27/26* (2013.01); *B64C 27/001* (2013.01); *B64D 13/00* (2013.01); *B64D 41/00* (2013.01);
(Continued)

(58) Field of Classification Search
CPC ...... B64D 27/001; B64D 27/26; B64D 41/00; B64C 27/001; F16F 15/08
See application file for complete search history.

(56) References Cited

U.S. PATENT DOCUMENTS 5,205,029 A * 4/1993 De Antonio ............ B29C 45/14
 29/436
5,251,883 A * 10/1993 Simon ..................... F16F 13/00
 267/136
(Continued)

FOREIGN PATENT DOCUMENTS

FR    2818717    6/2002
GB    1529171    10/1978

*Primary Examiner* — Michael H Wang

(57) ABSTRACT

Aircraft support structures, systems, and methods are disclosed. In one embodiment, an aircraft system includes a rotating component and a support (e.g. strut) that supports the rotating component. The support includes a locking assembly (P1) that is configured to lock, automatically, an inner member (214) of the support with respect to an outer member (208) of the support for stiffening the support in response to reaching or exceeding a predetermined threshold amount of displacement, load, stress, or rotation. The aircraft support structures, systems, and methods herein utilize self-locking and self-unlocking supports (e.g. struts) for increasing or decreasing a stiffness of the support.

24 Claims, 9 Drawing Sheets

(51) Int. Cl.
*B64D 13/00* (2006.01)
*B64D 41/00* (2006.01)
*F16F 15/08* (2006.01)

(52) U.S. Cl.
CPC ........ *F16F 15/08* (2013.01); *B64C 2027/002* (2013.01); *B64D 2027/262* (2013.01); *B64D 2041/002* (2013.01); *F16F 2230/0041* (2013.01); *F16F 2230/16* (2013.01); *Y02T 50/44* (2013.01)

(56) References Cited

U.S. PATENT DOCUMENTS

| | | | | |
|---|---|---|---|---|
| 6,092,795 A | * | 7/2000 | McGuire | F16F 9/10 267/140.11 |
| 6,140,720 A | * | 10/2000 | Certate | H02K 1/32 310/64 |
| 6,328,293 B1 | * | 12/2001 | Olsen | F16F 15/08 267/140.11 |
| 6,378,851 B1 | * | 4/2002 | McGuire | F16F 9/10 267/140.13 |
| 6,776,370 B2 | | 8/2004 | Struzik et al. | |
| 8,113,321 B2 | * | 2/2012 | McGuire | F16F 9/34 |
| 8,177,202 B2 | * | 5/2012 | De Forges | B60G 13/00 267/219 |
| 8,622,375 B2 | * | 1/2014 | Bosworth | F16F 9/10 267/140.11 |
| 9,188,190 B2 | * | 11/2015 | Bosworth | F16F 13/08 |
| 9,321,527 B2 | * | 4/2016 | Louis | B64C 27/51 |
| 9,481,455 B2 | * | 11/2016 | Yuce | B64C 27/51 |
| 2002/0154940 A1 | | 10/2002 | Certain | |
| 2010/0320358 A1 | | 12/2010 | Boyd et al. | |

* cited by examiner

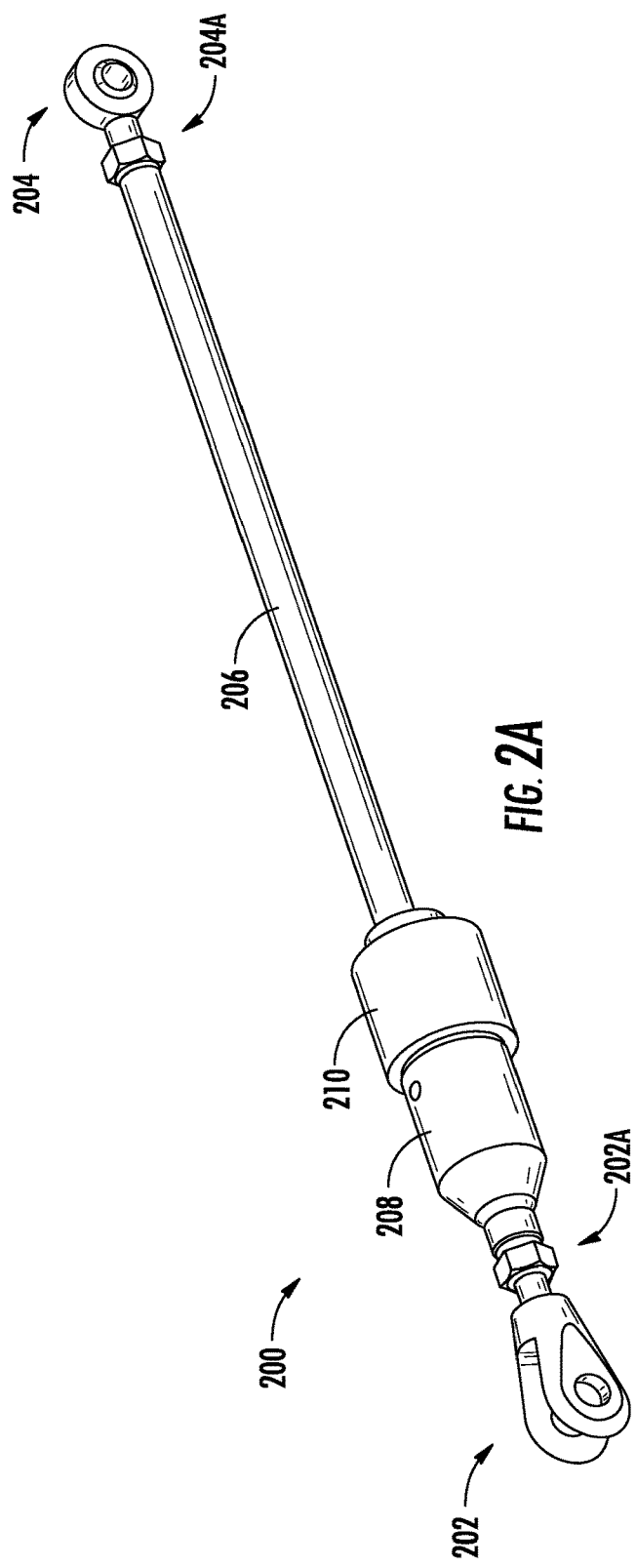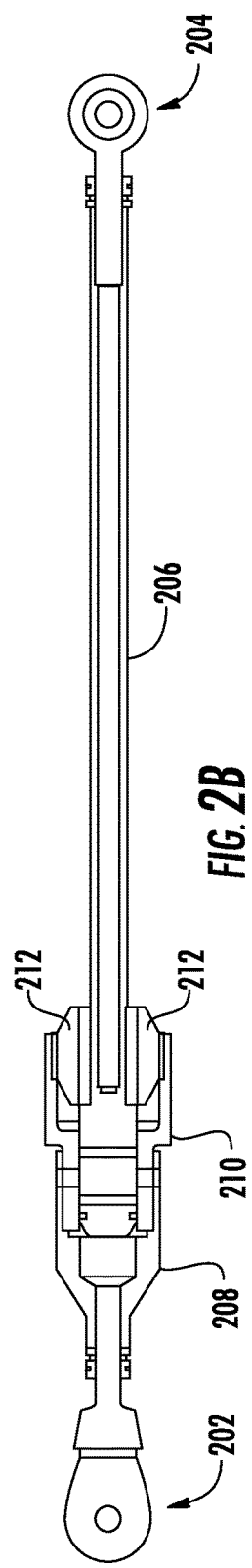
FIG. 2A
FIG. 2B

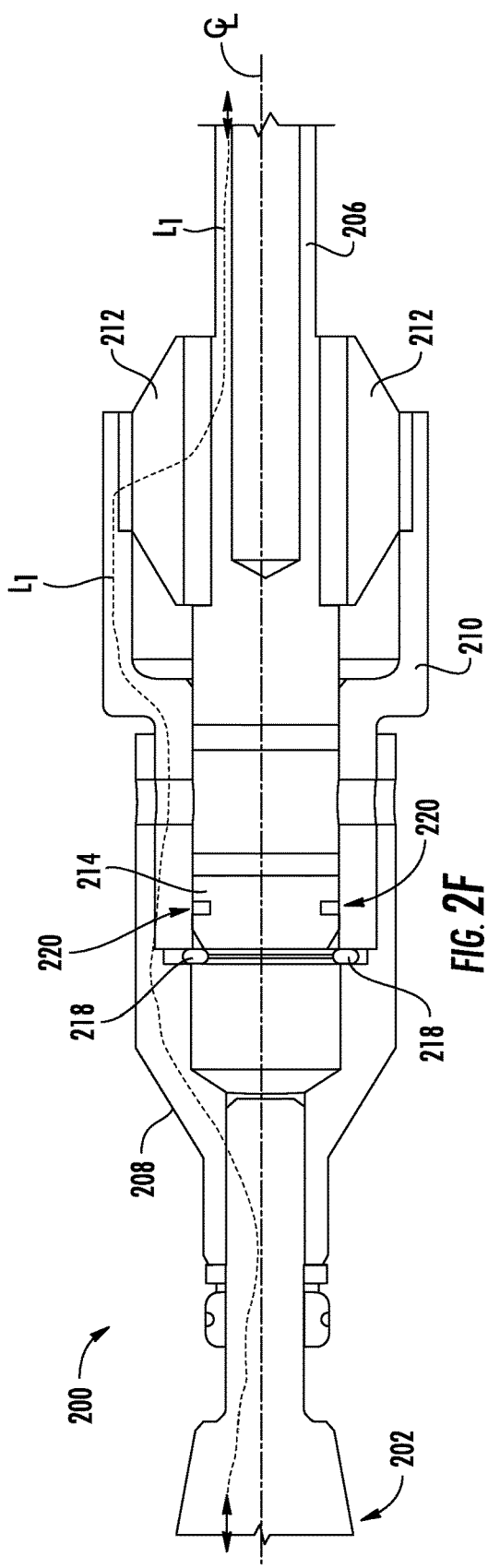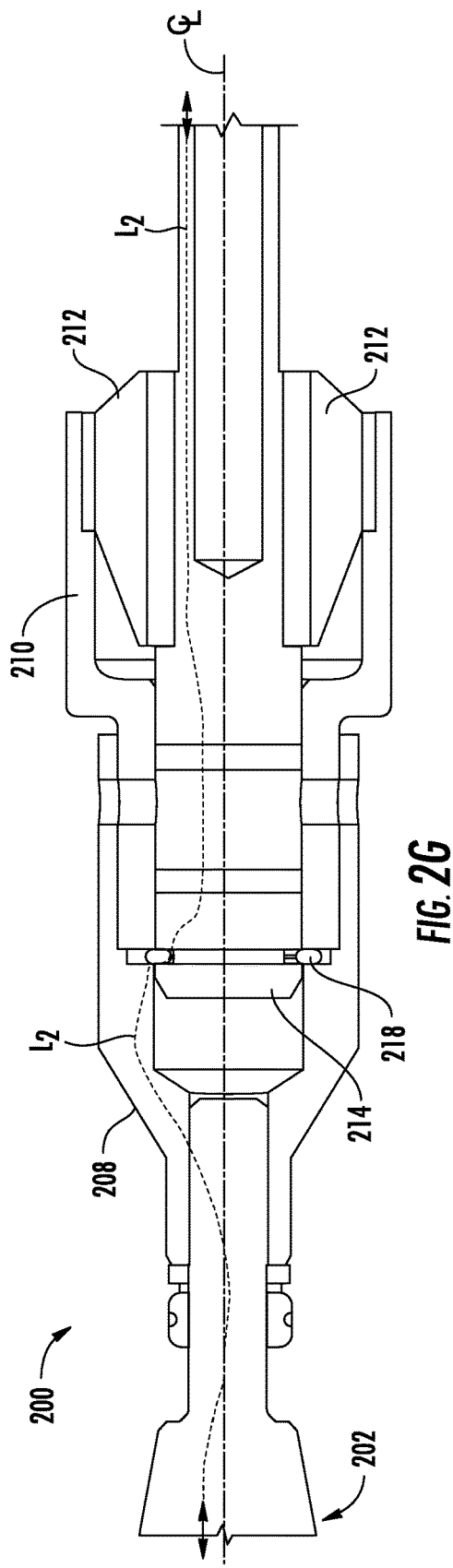

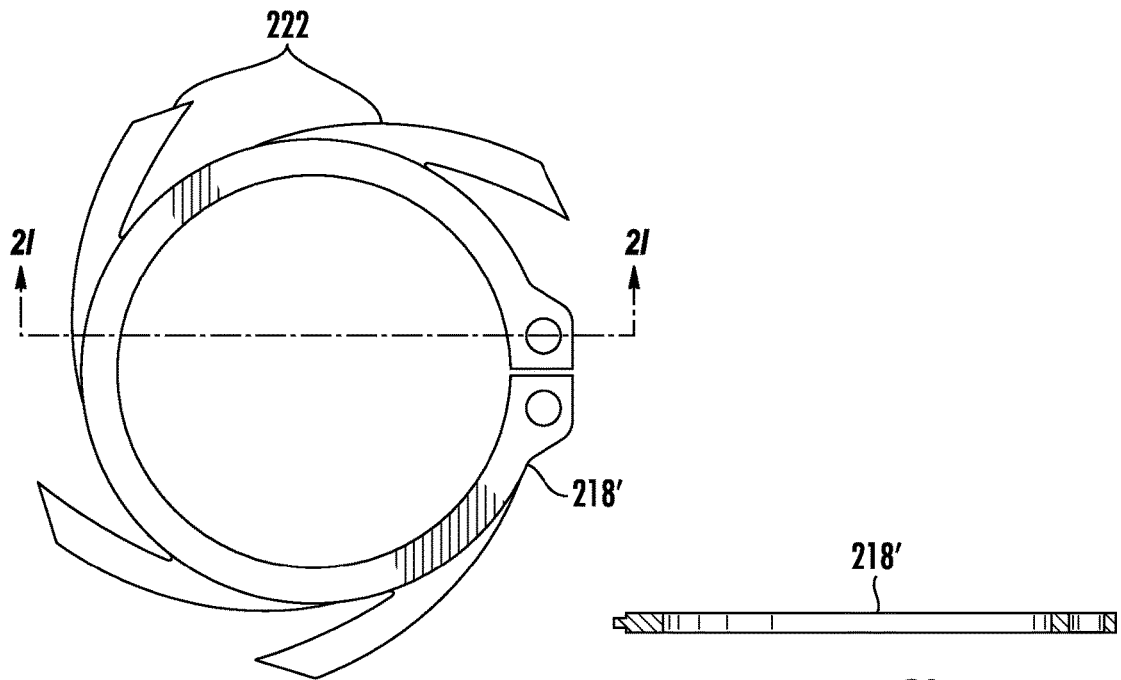
FIG. 2H
FIG. 2I
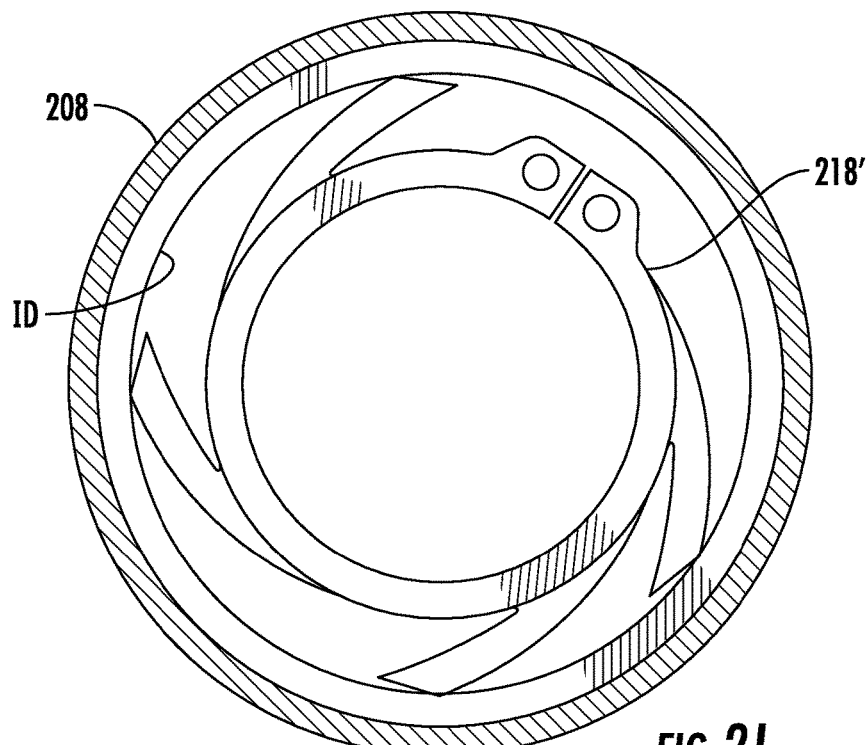
FIG. 2J

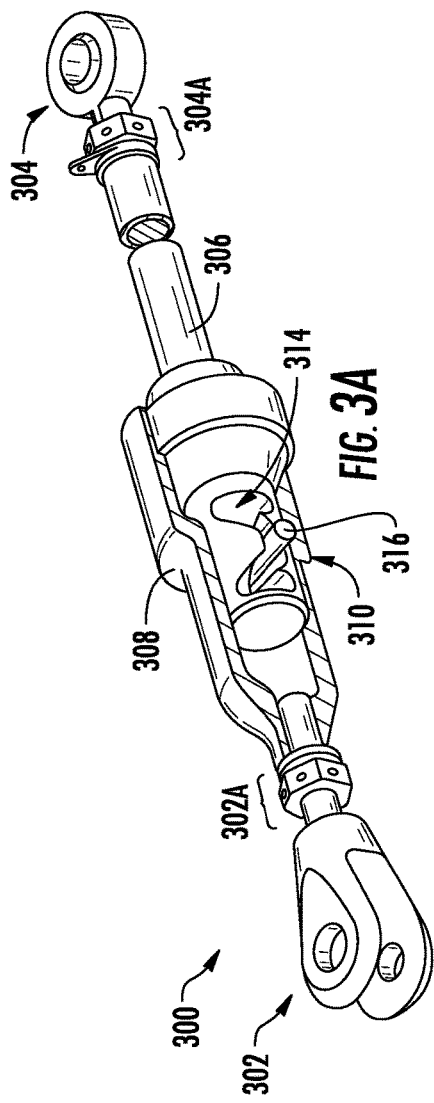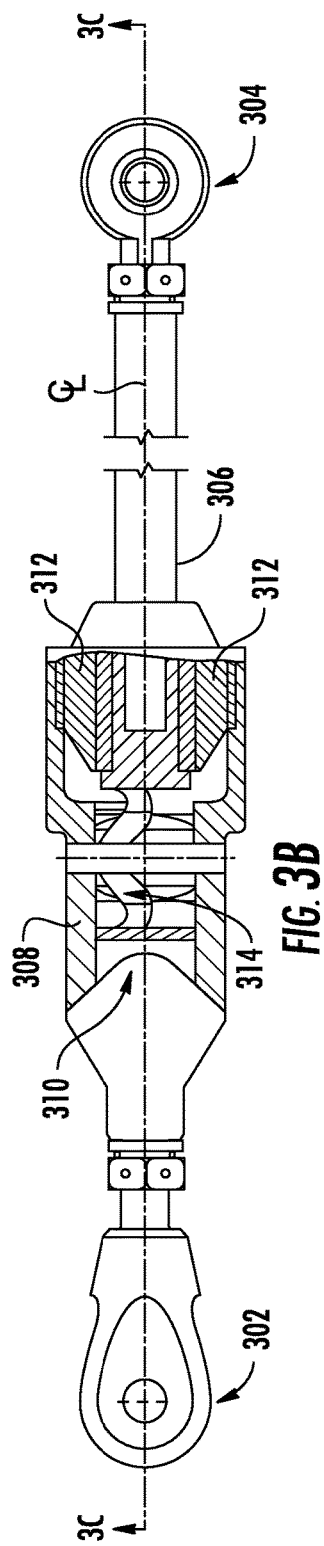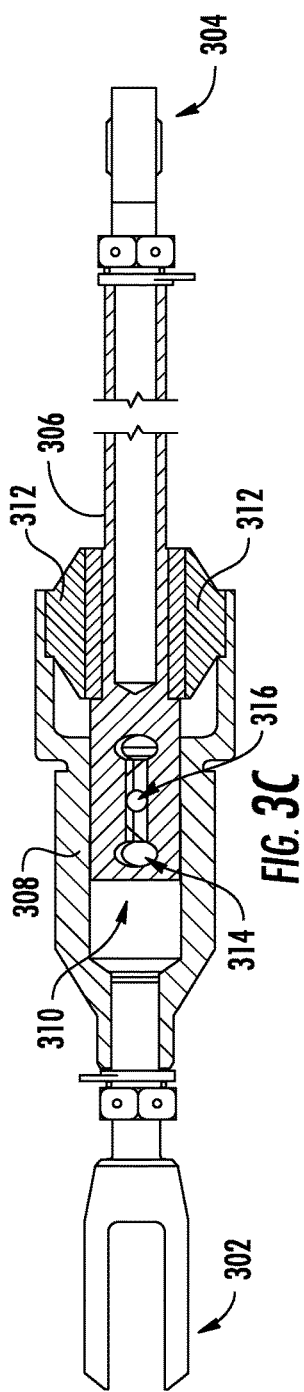

AIRCRAFT SUPPORT STRUCTURES, SYSTEMS, AND METHODS

CROSS-REFERENCE TO RELATED APPLICATIONS

The present application claims priority to U.S. Provisional Patent Application Ser. No. 62/218,147, filed on Sep. 14, 2015, the disclosure of which is incorporated herein by reference in its entirety.

TECHNICAL FIELD

The subject matter herein generally relates to the field of support structures, systems, and methods. The subject matter herein more particularly relates to aircraft support structures, systems, and methods.

BACKGROUND

In many applications within aircraft, rotating equipment and machinery are soft-mounted to provide benefit in reduced vibration and noise transmission into the aircraft structure. In many aircraft systems, dynamic excitation may occur, related either to failure of the machinery (e.g., rotating equipment), or due to unusual flight conditions or aerodynamic environments. In some instances, resulting low-frequency vibration events may contribute to increased transmission of vibration through attachments of some equipment within the aircraft. This is caused by excitation at or near the fundamental natural frequency of the supported equipment, thereby contributing to resonant response. In these cases, it may be desirable for the soft mounts to stiffen, for example, by changing to a hardened state. This effectively increases the stiffness of the attachment mounts, and shifts the rigid-body natural frequencies of the system away from the excitation frequency. This reduces the dynamic motion of the supported equipment, as well as the loads through the supporting structure and mounts.

One example of vibration caused by a rotating unbalance is a windmilling event. Windmilling is one example of this type of excitation, and occurs when an aircraft fan (e.g., an engine fan, a turbine, or the like) shuts down during flight, for example, upon rupturing one or more fan blades. The fan will continue to rotate, automatically, as an airstream passes therethrough. This occurrence is generally referred to as "windmilling" or a "windmilling event", as the airstream causes the non-energized fan to freely rotate, similar to a windmill.

Windmilling induces high loads that can propagate throughout aircraft structures and/or systems surrounding the fan. Certification requirements stipulate that support structures, such as struts, rods, bars, and/or beams be designed to carry out (e.g., dissipate or isolate) the high loads for preventing the loads from propagating to adjacent aircraft structures and/or systems. Conventional designs utilize "soft" struts, which include elastomeric materials for reducing shock; however, a problem arises during windmilling events, as the soft struts lack stiffness and thus may increase the transfer of dynamic loads and excitation to adjacent aircraft systems and/or equipment. This induces high displacement and stresses that either cannot be supported by the soft struts, or is damaging to the equipment.

One conventional solution aimed at reducing the high loads transferred in a soft component associated with abnormal high-vibration events includes incorporating snubbing features (e.g., shear pins) within the supporting structures. This is problematic; however, as snubbing features introduce additional vibrations and/or shocks, which are then transferred to adjacent aircraft structures surrounding the fan.

Accordingly, a need exists for improved aircraft support structures, systems, and methods, which are more robust in regards to reducing vibration loads and/or displacements.

SUMMARY

Self-locking aircraft support structures, systems, and methods are described herein. An exemplary aircraft system comprises a rotating component and a support configured to support the rotating component. The support includes a locking assembly that is configured to lock, automatically, an inner member of the support with respect to an outer member of the support for stiffening the support in response to reaching or exceeding a predetermined threshold amount of displacement, load, stress, or rotation.

In some embodiments, the rotating component comprises an aircraft engine, a turbofan, a fan, a turbine or any other unbalance source.

In some embodiments, the rotating component comprises an aircraft engine, and the support is disposed between the aircraft engine and at least one piece of aircraft equipment.

In some embodiments, the at least one piece of aircraft equipment includes a pump, an exhaust component, a fuselage component, a refrigeration unit, an auxiliary power unit (APU), or a controller.

In some embodiments, the locking assembly is disposed internally within a housing that is provided at one end of the support, and the locking assembly comprises at least one slot. In some embodiment, for example and in response to reaching or exceeding a predetermined threshold amount of a linear or axial displacement, a locking member moves with respect to the slot for locking the inner member of the support with respect to the outer member of the support, thereby increasing stiffness of the support.

In some embodiments, an elastomeric member is disposed around and contacts the support.

In some embodiments, the locking assembly comprises a pin that is lockable within a non-linear slot.

In some embodiments, the support comprises a strut that is at least partially hollow.

An exemplary aircraft comprises a plurality of supports attached to an aircraft system or aircraft equipment. A locking assembly is disposed within each of the plurality of supports. At least one locking assembly associated with a first support of the plurality of supports is selectively configured in an active, locked state for increasing the stiffness of the support. At least one other of the plurality of supports is selectively configured in an inactive, unlocked state for isolating loads.

In some embodiments, the aircraft system comprises an aircraft engine, and the plurality of supports is attached to the aircraft engine.

In some embodiments, a plurality of supports is disposed between the aircraft engine and at least one piece of aircraft equipment. The at least one piece of aircraft equipment may include a pump, an exhaust component, a fuselage component, a refrigeration unit, an APU, or a controller. The locking assembly can comprise at least one slot and a locking ring configured to be retained within a portion of the at least one slot.

An exemplary method of increasing support of an aircraft system or aircraft equipment comprises providing a rotating component, supporting the rotating component via at least one support structure, the support structure including a locking assembly. The method further includes displacing the support structure by a predetermined threshold amount. In response to displacing the support structure by the predetermined threshold amount, the method includes locking, automatically, an inner member of the support with respect to an outer member of the support via the locking assembly for stiffening the support.

In some embodiments, providing the rotating component comprises providing an aircraft engine, a turbofan, a fan, a turbine or any other unbalance source.

In some embodiments, providing the rotating component comprises providing an aircraft engine, and supporting the rotating component via at least one support structure comprises providing a plurality of support structures between the aircraft engine and at least one piece of aircraft equipment.

In some embodiments, the method further comprises providing the locking assembly within a housing at one end of the support structure, the locking assembly comprising a locking member and at least one slot. In some embodiments, the method includes elastically deforming the locking member in a radial direction until the locking member is received within the slot. In other embodiments, the method includes rotating the support structure to move the locking member with respect to a non-linear slot to lock the inner member of the support with respect to the outer member of the support.

In some embodiments, the locking assembly disposed within the support structure is configurable between an active state and an inactive state for selectively increasing the stiffness of the support structure or decreasing the stiffness of the support structure. As used herein, the "support" may also be referred to as a "strut" or a "support structure".

The support structures, systems, and methods described herein include supports (e.g., struts) having self-locking or self-actuating portions, such as self-locking assemblies configured to transition the support between a hard (e.g., locked or active) state and a soft (e.g., unlocked or inactive) state, automatically, as portions of the support experiences displacements, loads, stresses, and/or rotations that meet or exceed a predetermined threshold or predetermined amount. The predetermined amount may be varied, and may be user-configured or selected (e.g., for selective locking).

Self-locking supports may be attached between any aircraft system and (e.g., an engine, fan, pumps, electronics, refrigeration units, or the like) and/or between any aircraft equipment. Self-locking supports are configured to exhibit soft capabilities during normal operating conditions for isolating stresses and preventing stresses, loads, or vibrations generated by the rotating aircraft structure from propagating into the one or more adjacent aircraft structures. Self-locking supports are further configured to exhibit hard (stiff) capabilities, which are capable of withstanding high loads and/or displacements during abnormal events, not limited to windmilling or other high-vibration events.

As used herein, the term "selectively" may refer to at least one support of a plurality of supports hardening during use. That is, each support may selectively harden, in some aspects, individually and at a time at which a predetermined linear or axial displacement, load, or degree of rotation is reached or exceeded. The term "selectively" may also refer to a user manually selecting the amount of linear or axial displacement that triggers the support to harden, for example, via a wrenching, dialing, telescoping, or other physical adjustment.

Numerous objects and advantages of the subject matter will become apparent as the following detailed description of the preferred embodiments is read in conjunction with the drawings, which illustrate such embodiments.

BRIEF DESCRIPTION OF THE DRAWINGS

FIGS. 2A-2G are various views of an aircraft support structure according to an embodiment of the presently disclosed subject matter.

FIGS. 2H-2J are various views of a locking member according to an embodiment of the presently disclosed subject matter.

FIGS. 3A-3E are various views of an aircraft support structure according to an embodiment of the presently disclosed subject matter.

DETAILED DESCRIPTION

Figures (also "FIGS.") 1 to 4 illustrate various views, embodiments, aspects, and/or features associated with aircraft support structures, systems, and related methods. In some embodiments, the support structures, systems, and methods set forth herein are configured to adjust (change) a natural frequency mode of the supported equipment by increasing and decreasing stiffness. Increasing the stiffness of the support structures allows the structures to withstand increased loads. During normal operation at lower loads, however, a softer support structure may be provided for isolating loads and/or absorbing shock.

Changes in the natural frequency mode can occur automatically, for example, upon displacement (e.g., linear or axial) and/or rotation of a portion of the support structure by a predetermined amount. Changes in the natural frequency mode can occur selectively and/or automatically, for example, upon engaging and/or disengaging a movable locking member or a locking assembly including a locking member (e.g., a clip, ring, pin, slot, etc.) within the support structure.

The aircraft support structures described herein may include any structural component or member for fixedly supporting at least one aircraft system, structure, and/or portions thereof, for example, a beam, a rod, a strut, a bar, a shaft, a brace, a plate, a bracket, a column, a shock absorber, an isolator, or the like. In some embodiments, the support structures, systems, and/or methods described herein utilize multiple supports (e.g., struts) pivotally connected together and/or to an aircraft structure or system. The support structures, systems, and/or methods described herein are configured to stiffen (automatically) or soften (manually), as needed, for accommodating high (or low) loads, high (or low) displacements and/or high (or low) stresses. The structures, systems, and/or methods described herein exhibit an improved performance during normal operation and abnormal events, for example, during an event caused by a rotating unbalance.

Figure 1:
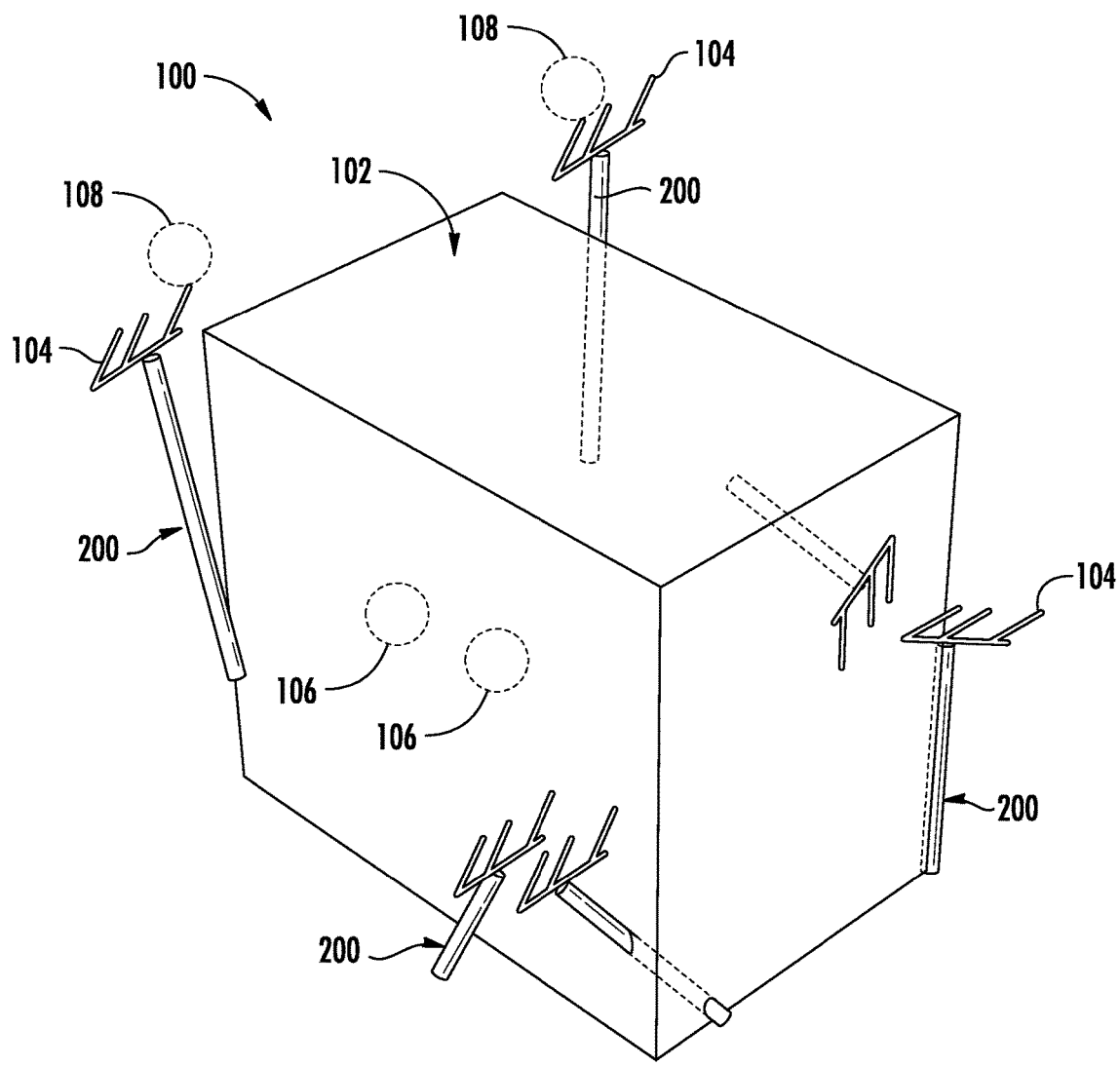
FIG. 1 is a schematic diagram of the interaction between an aircraft system, aircraft equipment, and aircraft support structures according to an embodiment of the presently disclosed subject matter.

FIG. 1 is a schematic diagram illustrating the interaction between aircraft support structures, aircraft equipment, and an aircraft system. FIG. 1 is an exemplary embodiment of a simplified system of an aircraft 100, whereby at least one aircraft system 102 and one or more aircraft structures or pieces of aircraft equipment 104 are supported by one or more aircraft support structures 200 (also referred to as "supports" or "struts").

Aircraft 100 includes at least one vibration source, which may be generated via aircraft system 102, aircraft equipment 104, any portion thereof, and/or a combination thereof. For example, the vibration source may be generated via aircraft system 102, aircraft equipment, or a combination of aircraft system 102 and equipment 104.

In some embodiments, aircraft system 102, or portions thereof, are rotating, non-rotating, and/or aircraft system 102 includes a combination of rotating and non-rotating portions, components, or parts. Rotating portions of aircraft system 102 include, for example, one or more rotating components 106, such as, for example and not limited to an engine, a fan, or the like. Non-rotating portions of aircraft system 102 include one or more non-rotating components, for example, electronic device(s), computing device(s), pump(s), vacuum component(s), sensor(s), exhaust component(s), a gearbox, refrigeration unit(s), or the like. In some embodiments, aircraft system 102 includes a combination of rotating and non-rotating components. As the one or more rotating components 106 associated with aircraft system 102 are optional, they are shown in broken lines for illustration purposes only.

In some embodiments, where portions of aircraft system 102 are rotating, vibrations and/or loads are imparted or carried to equipment 104 via supports 200. In some embodiments, where aircraft system 102 is non-rotating, it is subjected to receive vibrations generated by equipment 104 that either include rotating components 108 and/or is attached to rotating components 108. As rotating components 108 associated with equipment 104 are optional, they are shown in broken lines for illustration purposes only.

In some embodiments, one or more pieces of equipment 104 include and/or are attached to one or more rotating components 108. In other embodiments, none of the pieces of equipment 104 are attached to one or more rotating components 108. Vibrations and loads within aircraft 100 are induced via aircraft system 102, equipment 104, portion thereof, and/or combinations thereof. In some embodiments, rotating components 108 are integrated with equipment 104 or otherwise attached thereto. As equipment 104 and/or aircraft system 102 include respective rotating components 106, 108, dynamic loads and vibrations are transferred throughout aircraft 100 via the supporting structure comprised of a plurality of supports 200.

Supports 200 are configured to attach aircraft system 102 and equipment 104, and are disposed between aircraft system 102 and equipment 104. Equipment 104 includes any type of aircraft equipment, and in some aspects, many different types of equipment or components. Equipment 104 includes, for example, one or more electronic devices (e.g., an auxiliary power unit (APU), a controller, or the like), mechanical devices (e.g., a pump, a vacuum component, a pressure component, an exhaust component, a gearbox, a refrigeration unit, or the like), physical structures (e.g., a fuselage component, an engine mount component, or the like), or combinations thereof.

In some embodiments, aircraft system 102 includes one or more rotating components that generate vibrations, loads, and/or stresses. In a non-limiting exemplary embodiment, aircraft system 102 includes at least one rotating component 106 such as a fan that has a plurality of blades configured to rotate about an axis. Supports 200 are configured to isolate, mitigate, offset, absorb, and/or otherwise carry a majority of the vibrations, loads, and/or stresses in a "soft" state before the loads propagate into adjacent equipment 104. Thus, in some aspects and as described in detail below, supports 200 incorporate one or more shock-absorbing components (e.g., elastomers, elastomeric elements, plastic elements, silicone elements, rubber elements, or the like) that prevent loads, vibrations, and/or stresses from reaching equipment 104.

In some embodiments, during abnormal, high-vibration events, for example, caused by a rotating unbalance, one or more supports 200 are configured to transition from the "soft" state to a "hard" state, in which the one or more supports become locked into a stiffer configuration for better withstanding the high vibrations experienced during abnormal events. As used herein, the term "soft state" refers to an unlocked state, in which vibrations between portions of the support 200 (e.g., strut) are isolated via an elastomeric member (212, FIG. 2B). As used herein, the term "hard state" refers to a locked state, in which one portion of the strut is locked against another portion of the support 200 for increasing the stiffness thereof so that the majority of the loads bypass the elastomeric element.

Still referring to FIG. 1 and in further embodiments, the equipment 104 generates vibrations, loads, and/or stresses. Supports 200 thus isolate, mitigate, offset, absorb, and/or otherwise carry a majority of the vibrations, loads, and/or stresses before the loads propagate into aircraft 100. Supports 200 protect equipment 104 and/or aircraft system 102 from the airframe (e.g., aero-structure) vibration. Where either the aircraft system 102 and/or equipment 104 provide a source of a high-vibration or rotating unbalance, the one or more supports 200 individually stiffen in response to experiencing a predetermined amount of displacement, rotation, and/or load.

Where aircraft system 102, or portions thereof, become disabled during flight, an airstream continues to pass therethrough, causing aircraft system 102, or portions thereof, to rotate (e.g., freely rotate). In one non-limiting example, this occurs, for example, when a fan blade associated with aircraft system 102 ruptures, breaks, or otherwise fails. These occurrences are referred to as "windmilling" or "windmilling events". Windmilling events impart high loads, unbalance, displacements, and stresses to supports 200. As described in more detail below, supports 200 are configured to selectively and/or automatically "lock" or stiffen in response to the high loads, stresses, displacements, and/or rotation.

Each support 200 is configured to lock in unison when a portion of each support 200 becomes displaced or rotated by a predetermined amount or only one support 200 locks as that individual support becomes displaced or rotated by a predetermined amount. In some embodiments, only some supports 200 lock and some supports 200 remain unlocked. When locked, supports 200 stiffen for counteracting resonance during a rotating unbalance event; while other supports 200 remain soft for isolating vibration or loads. One or more supports 200 of a plurality of supports 200 selectively harden, as needed, to counteract high vibrations and rotating unbalances.

Stiffening or locking the supports 200 alters a load path associated therewith and results in the majority of a carried load to substantially bypass or become re-routed about the shock-absorbing components as high loads are experienced. Altering the load path not only alters the natural frequency mode of vibration for the supported equipment 104, but further reduces the transmissibility of loads and decreases an amount by which aircraft 100 is displaced, or vice versa. Thus, supports 200 exhibit an improved, more robust performance during instances of high loads, stresses, unbalance, and displacements, while continuing to maintain shock absorbing and/or vibration or load isolating capabilities during normal operation. Supports 200 are configured to substantially activate or deactivate the shock-absorbing elements thereof, either automatically or manually, as needed.

Figure 2C:
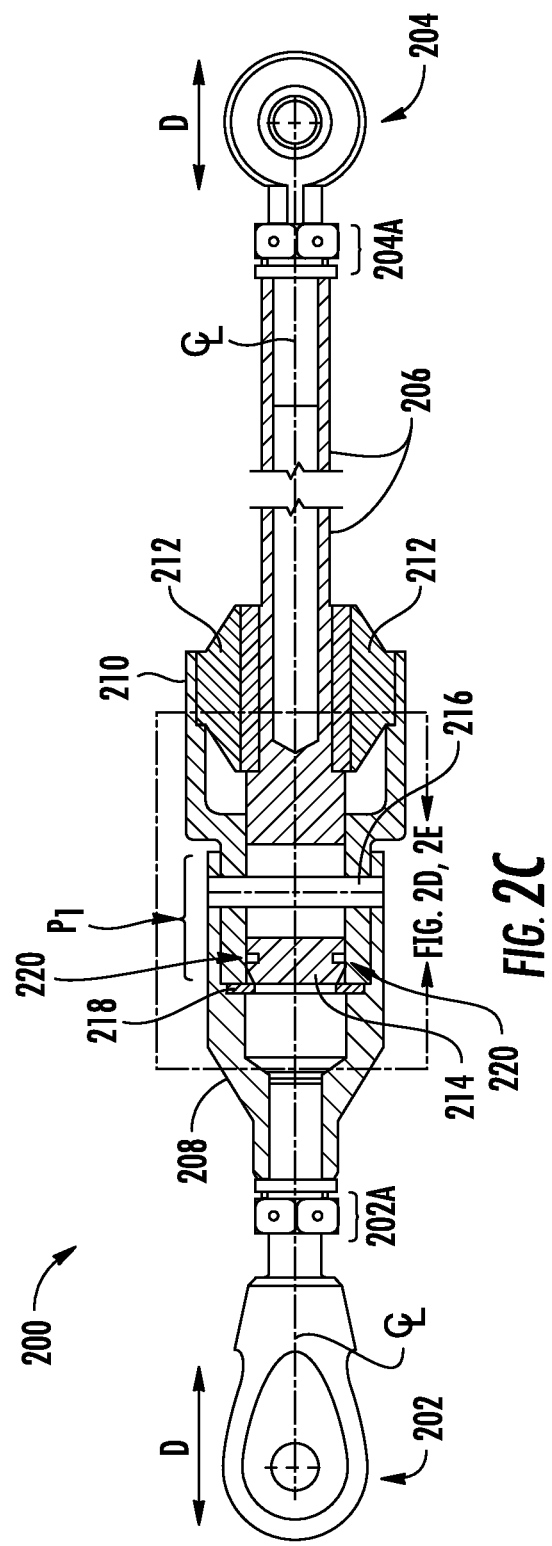

FIGS. 2A through 2G are various views illustrating a first embodiment of aircraft support structures, systems, and methods. Referring to FIGS. 2A through 2C in general, a more detailed embodiment of an individual support 200, which may also referred to as a "support structure", is illustrated. Support 200 includes a first end 202 and an opposing, second end 204. A rod 206 is disposed between first and second ends 202 and 204, respectively. Rod 206 extends into and/or otherwise be housed within one or more outer members, for example, a first outer member 208 and a second outer member 210. One end of rod 206, or a portion thereof, forms a locking assembly that, when activated, transitions rod 206 from a "soft" state to a locked or "hard" state for counteracting high vibrations via stiffness. High vibrations are experienced during abnormal events, for example, as caused by a rotating unbalance.

In one embodiment, first end 202 includes an optional clevis type or style of attachment configured to attach to a portion of aircraft equipment (e.g., 104, FIG. 1). Second end 204 includes an optional eyebolt or other type of fastener configured to attach to a portion of an aircraft system (e.g., 102, FIG. 1). Portions of equipment (e.g., 104, FIG. 1) and/or aircraft system (e.g., 102, FIG. 1) attached to opposing ends of support 200 are vibrating or rotating. Although first and second ends 202 and 204, respectively, are illustrated as including different types of fasteners, first and second ends 202 and 204 may also be identical in appearance, and include a same type of fastener. Any size, shape, and/or style of connector or fastener may be provided at each end of support 200. First end 202 includes a connecting assembly generally designated 202A which attaches first end 202 to a first outer member 208. Second end 204 includes a connecting assembly generally designated 204A which attaches rod 206 to a second outer member 210. In some embodiments, each of first and second connecting assemblies 202A and 204A, respectively, includes a locking nut and washer (not shown).

Referring to FIG. 2B, second outer member 210 is connected to and/or includes one or more shock absorbing components, such as an elastomeric component or elastomeric member 212. In some embodiments, outer member 210 is disposed about (i.e., around and contacting) portions of elastomeric member 212, and elastomeric member is disposed between portions of outer member 210 and rod 206. In some embodiments, elastomeric member 212 is disposed around and contacts an outer surface of support 200, or portions thereof.

Elastomeric member 212 can comprise an elastomeric ring of material having a variable thickness disposed about rod 206. During normal operation at normal loads, elastomeric member 212 is engaged or activated, for absorbing, isolating, or otherwise carrying the bulk of the loads transferred thereto from a rotating aircraft system or equipment (e.g., 102 or 104, FIG. 1) via second end 204. Support 200 is elongated and substantially cylindrical in shape, and portions thereof may be hollow for receiving a locking assembly. A hollow support 200, or an at least partially hollow support 200, further reduces the weight and cost of providing aircraft systems.

FIG. 2C illustrates a sectional view of support 200. As FIG. 2C illustrates, support 200 includes a locking portion or a locking assembly generally designated $P_1$ disposed therein.

In some embodiments, locking assembly $P_1$ includes a self-locking assembly and/or self-actuating portion of support 200 that extends from rod 206. As support 200 becomes displaced and/or rotated, locking assembly $P_1$ is configured to activate (automatically or selectively) to stiffen support 200. This provides support 200 with an increased stiffness for accommodating increased loads and/or displacements that occur during abnormal operating conditions or events, such as and not limited to, windmilling events.

Locking assembly $P_1$ includes an inner member 214 and a movable locking member 218. A pin 216 is disposed in support 200. Pin 216 is configured to connect first and second housing members 208 and 210, respectively, and act as a snubbing feature for a fail-safe design, if ever elastomer element were 112 to fail. In some embodiments, pin 216 includes a shear pin connecting first and second outer members 208 and 210, respectively. In some embodiments, first and second outer members 208 and 210, respectively, include hollow housing portions configured to house locking assembly $P_1$. A portion of second outer housing member 110 may be nested or disposed within a portion of first housing member 208 and retained therein via pin 216.

Still referring to FIG. 2C, inner member 214 extends from and/or otherwise includes a rod end comprising a movable locking member having a tapered body with at least one retention groove 220 disposed within the tapered body. Retention groove 220 comprises a recess, a channel, a slot, or indentation that is disposed or otherwise formed in an outer perimeter of inner member 214, or portions thereof. Retention groove 220 is configured to receive locking member 218, or portions thereof, for selectively stiffening support 200 in response to support 200 reaching and/or exceeding a predetermined load or displacement. Inner member 214 is integrally formed with one end of rod 206. Inner member 214 and locking member 218 collectively form a self-locking assembly provided at one end of rod 206.

Still referring to FIG. 2C, and in some embodiments, movement or displacement of rod 206 as indicated by directions D (e.g., at one or both of first or second ends 202 and/or 204, respectively) induces rod 206 and inner member 214 of rod 206 to move in a direction along (e.g., substantially parallel to) centerline $C_L$. In response to the linear displacement of rod 206 and inner member 214, locking member 218 is received within groove 220. When locking member 218 is received and fixedly held in groove 220, additional stiffness is imparted to support 200, which alters a load path associated with support 200. The majority of the carried load and/or displacement becomes re-routed about elastomeric member 212, causing support 200 to act as a "hard" support as opposed to a "soft" support. Notably, in some embodiments, support 200 is configured to act as a hard or a soft support automatically and/or selectively, where desired, for operability during both normal operating conditions and abnormal (high-vibration) events.

In some embodiments, locking member 218 comprises, for example, a locking ring, a clip (e.g., a C-clip), a cinching ring, a snap ring, a split ring, a clamp, or a spring-loaded component, a portion of which is urged into groove 220 for securing to inner member 214. When activated, locking member 218 of locking assembly $P_1$ is secured to inner member 214, and inner member 214 becomes secured and/or retained within a portion of second housing 208. The transmissibility of loads through elastomeric member 212 is reduced, which increases the stiffness of support 200 and decreases displacement between aircraft systems and/or equipment (e.g., 102 and 104, FIG. 1), respectively.

Figure 2D:
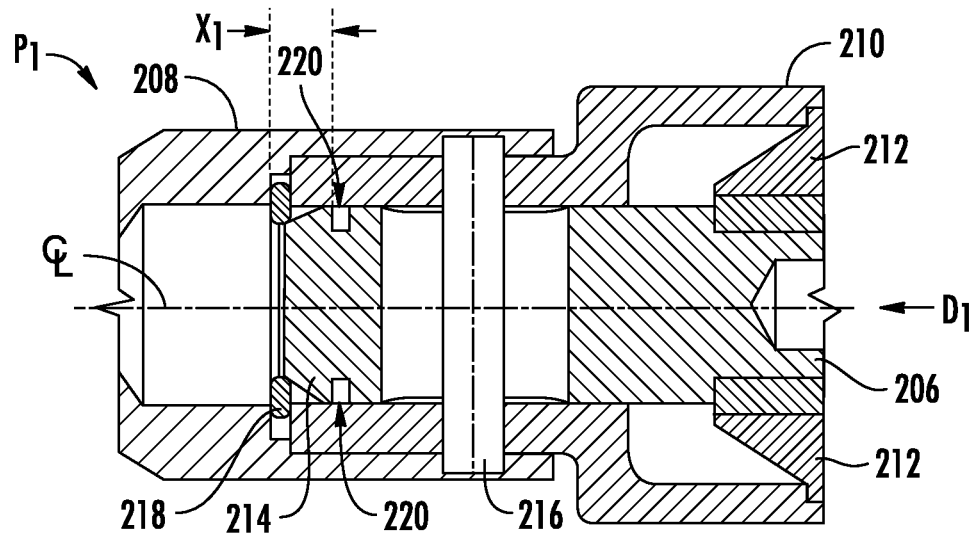
Figure 2E:
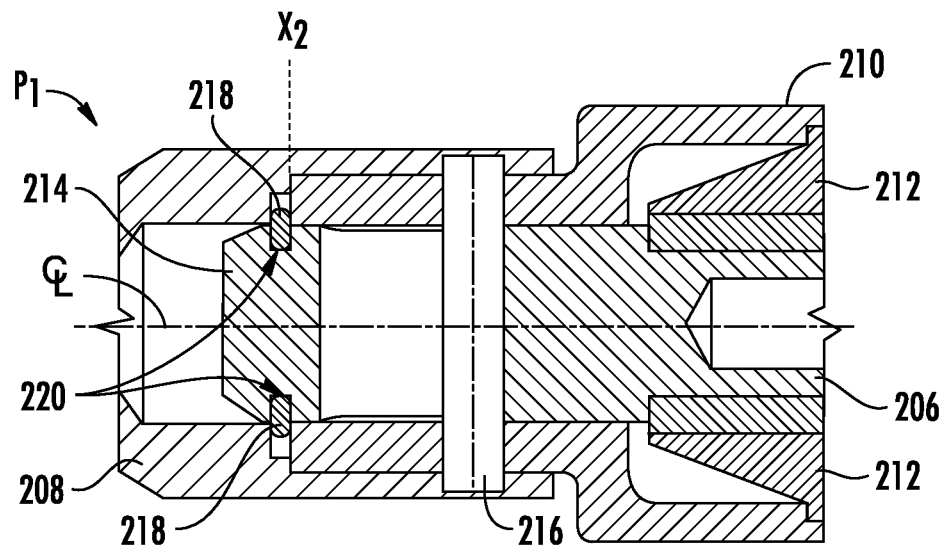

FIGS. 2D and 2E are detailed views of locking portion or locking assembly $P_1$. FIG. 2D illustrates locking assembly $P_1$ in an inactive state (also referred to as a soft or unlocked state). In an inactive state, locking member 218 is not disposed in groove 220, and inner member 214 is not disposed within a portion of outer member 208. Thus, the connection between outer members 208 and 210 via pin 216 remains soft, and the majority of loads are dissipated or carried by elastomeric member 212.

Elastomeric member 212 may include an inner diameter or opening, which is disposed about and/or engaged (for gripping or frictional engagement) about an outer diameter of rod 206. During an active state, elastomeric member 212 continues to engage rod 206, however, the load path becomes altered such that elastomeric members 212 are no longer used for carrying the majority (bulk) of the loads. Rather, the load path extends through the locking member 218 and inner member 214 of rod 206 and locking assembly $P_1$.

Referring still to FIG. 2D, and in some embodiments, movement or displacement of rod 206 in a direction $D_1$ by a predetermined linear displacement amount $X_1$, triggers locking assembly $P_1$ to automatically lock or fuse as locking member 218 moves up (along) the tapered portion of inner member 214 (i.e., the end of rod 206) and then drops into groove 220 thereof. This movement fixedly secures inner member 214 within portions (e.g., inner diameters) of first and second outer members 208 and 210, respectively. In response to an amount of linear displacement $X_1$ of rod 206, inner member 214 of rod 206 is urged forward into an inner diameter of first outer member 208 thereby securing inner member 214 to outer member 208.

FIG. 2E illustrates locking assembly $P_1$ in an active state (also referred to as a hard or locked state). As inner member 214 of rod 206 becomes moved or displaced in a direction along centerline $C_L$, a tapered outer diameter of inner member 214 is urged into and/or through an opening (aperture, hole) disposed in locking member 218. In response, locking member 218 is elastically deformed in the radial direction along the displacement and conical shape of inner member 214 until being released in the groove 220. This increases the stiffness of support 200 via locking rod 206, and inner member 214 thereof, within an inner diameter of first outer member 208 and second outer member 210 for preventing rod 206 from further displacement.

Thus, rod 206 is disposed in a locked position as indicated by the line extending from position $X_2$, and prevented from further displacement to resist high loads and displacements during abnormal, high-vibration events. Such events may occur as a result to a rotating imbalance, such as a windmilling event. In some embodiments, locking assembly $P_1$ reverts to the inactive state (e.g., FIG. 2D) manually, which includes a default state, for example, a tool is used to adjust locking assembly $P_1$ to the default state (e.g., unlocked, inactive state) as illustrated by FIG. 2D.

FIGS. 2F and 2G illustrate a load path as carried by support 200 during an inactive or soft state compared to an active or hard (stiff) state. FIG. 2F illustrates a first load path $L_1$ carried by support 200 during a soft, inactive, and/or unlocked state. First load path $L_1$ traverses a length of support 200 that extends between first and second ends 202 and 204, respectively. In an inactive or soft state (configuration), first load path $L_1$ extends or traverses along portions of first outer housing 208, second outer housing 210, elastomeric member 212, and rod 206. Elastomeric member 212 softens support 200 and prevents load propagation during normal, in-flight operating conditions. In some embodiments, support 200 is in a soft, inactive state or configuration during a normal flight, so that locking assembly $P_1$ remains inactive. Elastomeric member 212 isolates, dissipates, or softens vibrations, loads, and/or stresses before the vibrations, loads, and/or stresses propagate through aircraft structures that are adjacent to a rotating aircraft structure or component (e.g., an aircraft engine, turbofan, turbine, a fan, or any other unbalance source).

FIG. 2G illustrates a second load path $L_2$ carried by support 200 during a hard, active, or otherwise locked state. Second load path $L_2$ may be invoked automatically (i.e., support 200 may be self-locking) in response to rod 206 meeting or exceeding a predetermined displacement amount and/or rotation of rod 206.

In some embodiments, second load path $L_2$ is also invoked selectively, for example, when a user, customer, or certifying entity selects sets or determines the predetermined amount that triggers the transition from the soft to the hard configuration. The predetermined amount is selected during a design phase, a manufacturing phase, and/or prior to installation of support 200. For example, a customer mechanically adjusts (e.g., via a wrenching, telescoping, or dialing feature, or any other externally adjustable feature) the amount of displacement (e.g., $X_1$, FIG. 2D) that triggers transition from the soft to the hard state.

Second load path $L_2$ extends along a length of support 200 between first and second ends 202 and 204, respectively. In a locked or hard state (configuration), second load path $L_2$ traverses and/or extends through portions of first outer housing 208, second outer housing 210, locking member 218, inner member 214 of rod 206, and rod 206. Thus, load path $L_2$ bypasses and/or becomes re-routed at least partially about second outer member 210 and re-routed at least partially about elastomeric member 212. Elastomeric member 212 becomes disengaged and/or deactivated when support 200 is in an active (locked) configuration. Thus, support 200 is configured in either a soft state or a hard state, and transitions between states (e.g., automatically or manually) upon rod 206 reaching or exceeding a predetermined, selective displacement amount, rotation amount (see e.g., FIGS. 3A to 3E), torsional amount, or the like. Isolating elastomeric member 212 from the load path, or otherwise rendering elastomeric member 212 substantially inactive, causes support 200 to stiffen during abnormal events, and provides a higher resistance for withstanding loads and/or displacements that occur during abnormal (e.g., high-vibration) events, such events caused by any rotational unbalance in an aircraft system or equipment.

FIGS. 2H through 2J are various views illustrating in one aspect exemplary details of locking member 218'. Some embodiments of support 200 require locking member 218' to be placed in a recess located in outer member 208. A clearance is provided to allow locking member 218' to expand when it moves over the tapered outer diameter of inner member 214. To keep the locking member 218' centered in the recess, a plurality of finger elements 222 are provided. FIG. 2H depicts one embodiment of locking member 218', where the finger elements 222 extend tangentially outward from the perimeter of the ring. FIG. 2I illustrates a cross-sectional view of locking member 218'. FIG. 2J illustrates locking member 218' assembled into a recess of and contacting an inner diameter ID of outer member 208. The finger elements 222 contact the inner diameter in a substantially tangential direction, allowing the fingers to easily bend.

It will be appreciated that FIGS. 2A through 2G are for illustration purposes only, and self-locking supports that automatically transition from a soft to a hard state may encompass additional embodiments, one of which is described below. Different structures, materials, and/or configurations may be provided and are contemplated for providing an aircraft support (or support structure) that automatically stiffens at higher loads, displacements, and/or during abnormal events, as needed. One portion of a self-locking support (e.g., a pin, clip, etc.) is configured to fuse and/or lock with a second portion of the support (e.g., a slot, or the like) for stiffening the support and withstanding the rotating component dynamic loads.

Figure 3D:
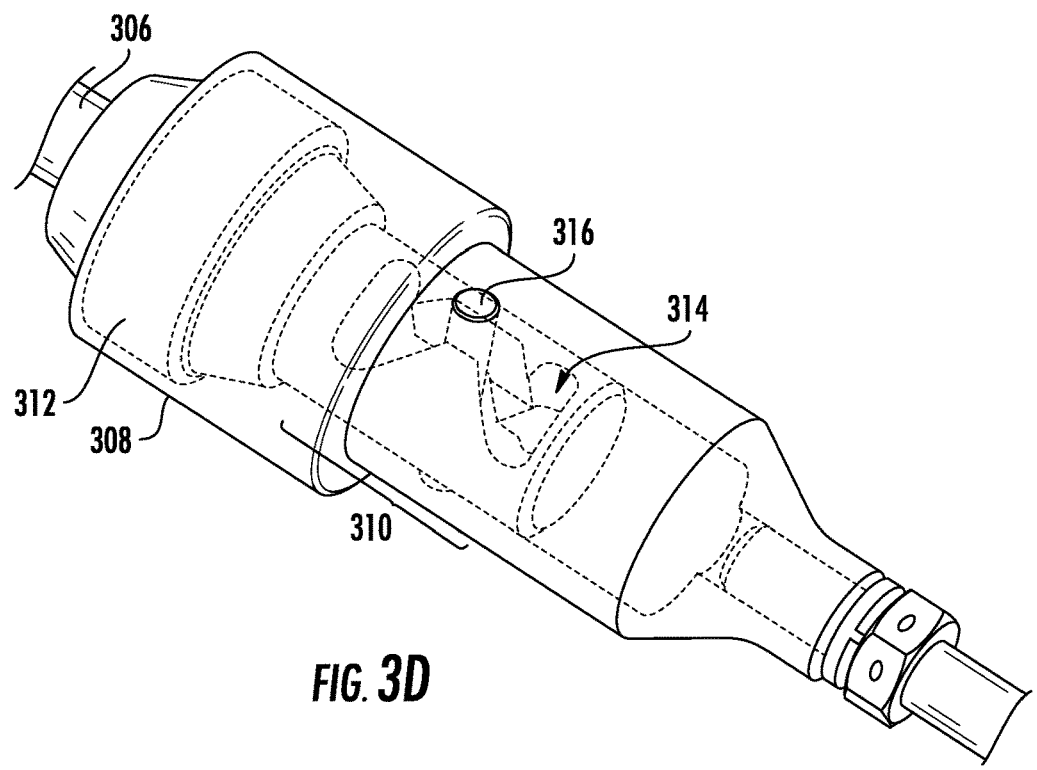

FIGS. 3A through 3E are various views illustrating a second embodiment of an aircraft support structure, system, and/or method. Referring to FIGS. 3A through 3C in general, a support structure (support) generally designated 300 is illustrated. Support 300 includes a first end 302 and an opposing, second end 304. A rod 306 is disposed between first and second ends 302 and 304, respectively. First end 302 includes an optional clevis-type attachment configured to attach to an aircraft structure or aircraft equipment (e.g., 104, FIG. 1). Second end 304 includes an optional eye bolt or other type of fastener configured to attach to an aircraft system (e.g., 102, FIG. 1), a portion of which is rotating. Ends 302 and 304 may include an identical fastener, or dissimilar fasteners, and may be altered/changed depending upon the application.

First end 302 includes a connecting assembly generally designated 302A which attaches first end 302 to an outer member 308. Second end 304 includes a connecting assembly generally designated 304A which attaches to rod 306. One end of rod 306 includes and/or is fitted with a locking assembly or self-locking assembly, generally designated 310. Each of first and second connecting assemblies 302A and 304A, respectively, includes a locking nut and washer (not shown). Outer member 308 is disposed at least partially around locking assembly 310.

Referring to FIG. 3B, outer member 308 is connected and/or includes one or more shock absorbing components, such as an elastomeric component or elastomeric member 312. In some embodiments, elastomeric member 312 comprises an elastomeric ring of variable thickness that is disposed about rod 306, or portions thereof. During normal operation at normal loads, elastomeric member 312 is disposed along a load path, and absorbs, isolates, or otherwise carries loads transferred thereto from a system or piece of equipment (e.g., 102 or 104, FIG. 1) via one end (e.g., 302, 304). Support 300 is substantially cylindrical in shape, and portions thereof are hollow for receiving locking assembly 310. In some embodiments, locking assembly 310 is provided and/or disposed at one end of rod 306. A hollow support 300, or an at least partially hollow support 300, further reduces the weight and cost of providing aircraft systems.

FIGS. 3B and 3C illustrate sectional views of support 300 and locking assembly 310. In some embodiments, locking assembly 310 includes a self-locking assembly and/or self-actuating portion of support 300. As support 300 is displaced axially, subject to excessive vibration or static load, it becomes twisted or rotated about centerline $C_L$. In response to the axial displacement, locking assembly 310 is configured activate for stiffening structure 300. This provides structure 300 with increased stiffness for accommodating increased loads and/or displacements that may occur during abnormal operating conditions or events, such as high-vibration events resulting from a rotating unbalance.

Referring to FIGS. 3B and 3C, locking portion 310 includes a body that is an extension of rod 306 and attached thereto. Locking portion 310 includes a body that includes a groove, channel, trench, or slot generally designated 314. Slot 314 comprises a non-linear shape (e.g., a helicoid), such that upon rotation of rod 306, a pin 316 (FIG. 3C) is urged into one end of slot 314, and locked therein. Slot 314 comprises a non-linear shape, having an elongated shape along a same axis as elongated centerline $C_L$. As rod 306 twists and/or turns, during increased displacement at resonance, pin 316 is urged along an elongated direction of slot 314 until it abuts against and/or becomes locked within a portion thereof, such as an extreme end portion of slot 314. In some embodiments, pin 316 is fixed or "standing" within slot 314 of locking portion 310. In some embodiments, outer member 308 and first end 302 are be fixed such that axial displacement of rod 306 creates a rotation of rod 306 around $C_L$ as a result of pin 316 standing within the non-linear (e.g., helicoid) shaped groove 314. Displacement of rod 306 is a combination of axial and torsional displacement.

Figure 3E:
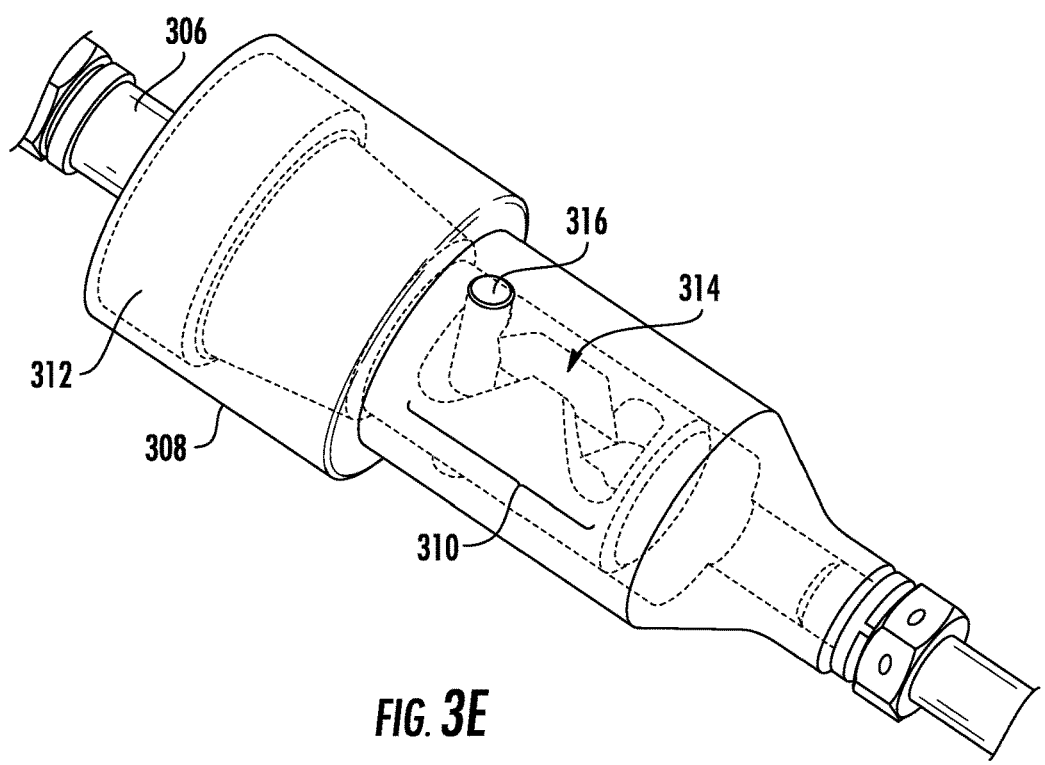

FIGS. 3D and 3E are detailed views of locking portion or locking assembly 310. FIG. 3D illustrates locking assembly 310 in an inactive state (also referred to as a soft or unlocked state). In the inactive state, pin 316 is not fixed, secured, or otherwise locked against a portion of slot 314, and axial/torsional displacement moves slot 314 about pin 316. Thus, the connection between rod 306 and elastomeric member 312 remains soft, and loads are dissipated or carried by elastomeric member 312. Elastomeric member 312 may include an inner diameter or opening, which is disposed about and/or engaged (for gripping or frictional engagement) about an outer diameter of rod 306. During an active state, elastomeric member 312 continues to engage rod 306, however, the load path is altered such that elastomeric member 312 is no longer primarily used to carry dynamic loads. Rather, the load path extends through the locking member 310 and pin 316.

FIG. 3E illustrates locking assembly 310 in an active state (also referred to as a hard or locked state). As rod 306 is moved, for example, via twisting, turning, axially displacing, or rotating, assembly 310 moves about slot 314 and is fixed or locked with about pin 316 and rod 306 is prevented from further displacement and/or rotation. Thus, support 300 is better able to resist high loads that occur during abnormal, high-vibration events.

Figure 4:
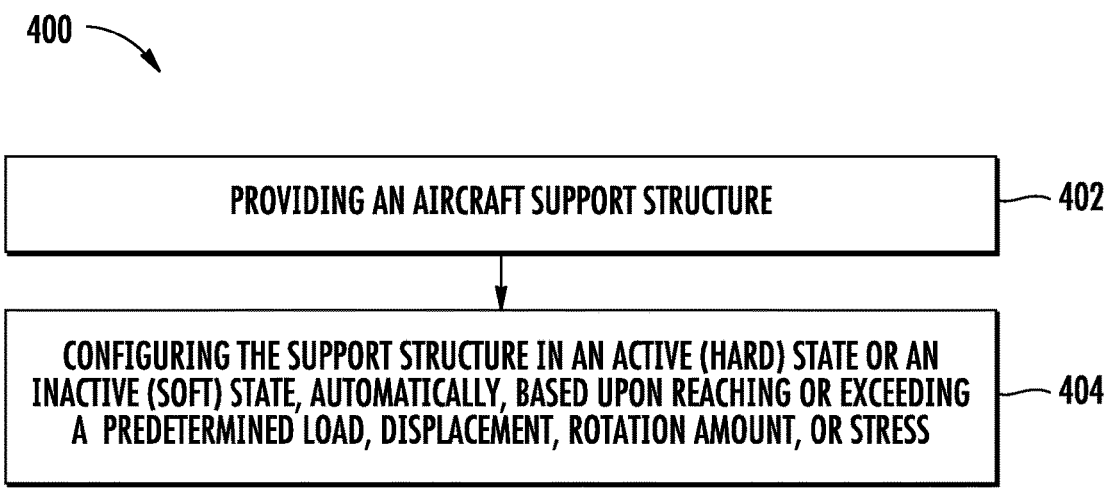
FIG. 4 is a block diagram of an exemplary method for increasing support of an aircraft structure or aircraft equipment according to an embodiment of the presently disclosed subject matter.

FIG. 4 is a block diagram of an exemplary method generally designated 400 for providing aircraft support structures, systems, and methods. In block 402, an aircraft support structure (support) is provided. The support may include a strut having a locking assembly disposed therein.

In block 404, the locking assembly is configured in an active state or an inactive state based upon reaching or exceeding a predetermined load, displacement, rotation amount, or stress. In some embodiments, the locking assembly transitions from an inactive state to an active state when a portion of the strut (e.g., the rod) reaches or exceeds a predetermined displacement, axial displacement, rotation, or torsion value. Configuring the locking assembly in an active state provides a hard support, which increases the stiffness thereof for increasing the structure's ability to withstand abnormal events, including but not limited to windmilling events. Configuring the locking assembly in an inactive state provides a soft support for improving load dissipating, shock absorbing, and/or vibration isolating capabilities. Notably, support structures herein exhibits both soft behavior and hard behavior. Self-locking assemblies comprise translational or rotational locking mechanisms, where desired.

In another exemplary method, a method of increasing support of an aircraft system during a high-vibration event is provided. The method includes providing a rotating system and/or rotating equipment (e.g., 102 or 104, FIG. 1), supporting the rotating system and/or equipment with at least one support structure (e.g., 200 or 300, FIGS. 2A to 3E), and displacing (e.g., linearly or axially) and/or rotating a portion of the support structure to activate a locking assembly disposed therein. Activating the locking assembly alters a natural frequency mode of the supported system and increases the stiffness thereof during a high-vibration event caused by a rotating unbalance.

Other embodiments of the current subject matter will be apparent to those skilled in the art from a consideration of this specification or practice of the subject matter disclosed herein. Thus, the foregoing specification is considered merely exemplary of the current subject matter with the true scope thereof being defined by the following claims.

What is claimed is:

1. An aircraft system (102) comprising:
a rotating component (106); and
a support (200) configured to support the rotating component, wherein the support includes a locking assembly ($P_1$) that is configured to lock, automatically, an inner member (214) of the support with respect to an outer member (208) of the support for stiffening the support in response to reaching or exceeding a predetermined threshold amount of displacement, load, stress, or rotation.

2. The aircraft system according to claim 1, wherein the rotating component (106) comprises an aircraft engine, a turbofan, a fan, a turbine, or any other unbalance source.

3. The aircraft system according to claim 1, wherein the rotating component (106) comprises an aircraft engine, and wherein the support (200) is disposed between the aircraft engine and at least one piece of aircraft equipment.

4. The aircraft system according to claim 3, wherein the at least one piece of aircraft equipment includes a pump, an exhaust component, a fuselage component, a refrigeration unit, an auxiliary power unit (APU), or a controller.

5. The aircraft system according to claim 1, wherein the locking assembly ($P_1$) is disposed internally within a housing (210) that is provided at one end (202) of the support, and wherein the locking assembly comprises at least one slot (220).

6. The aircraft system according to claim 5, wherein, in response to reaching or exceeding a predetermined threshold amount of a linear or axial displacement, a locking member (218) moves with respect to the slot (220) for locking the inner member (214) of the support with respect to the outer member (208) of the support, thereby increasing stiffness of the support.

7. The aircraft system according to claim 6, wherein the locking member (218) comprises centering fingers which extend to a diameter of a locking member recess in the outer member (208).

8. The aircraft system according to claim 1, further comprising an elastomeric member (112) disposed around and contacting the support.

9. The aircraft system according to claim 1, wherein the locking assembly ($P_1$) comprises a pin (316) that is lockable within a non-linear slot (314).

10. The aircraft system according to claim 1, wherein the support (200) comprises a strut, and wherein the strut is at least partially hollow.

11. The aircraft according to claim 1, wherein the support (200) comprises a strut, and wherein the strut is at least partially hollow.

12. An aircraft (100) comprising:
a plurality of supports (200) attached to an aircraft system (102) or aircraft equipment (104); and
a locking assembly ($P_1$) disposed within each of the plurality of supports;
wherein at least one locking assembly associated with a first support of the plurality of supports is selectively configured in an active, locked state for increasing a stiffness of the support; and
wherein at least one other of the plurality of supports is selectively configured in an inactive, unlocked state for isolating loads.

13. The aircraft according to claim 12, wherein the aircraft system (102) comprises an aircraft engine, and wherein the plurality of supports is attached to the aircraft engine.

14. The aircraft according to claim 13, wherein the plurality of supports (200) is disposed between the aircraft engine and at least one piece of aircraft equipment (104).

15. The aircraft according to claim 14, wherein the at least one piece of aircraft equipment (104) includes a pump, an exhaust component, a fuselage component, a refrigeration unit, an auxiliary power unit (APU), or a controller.

16. The aircraft according to claim 12, wherein the locking assembly ($P_1$) comprises at least one slot (220) and a locking ring (218) configured to be retained within a portion of the at least one slot.

17. The aircraft according to claim 12, further comprising an elastomeric member (112) disposed around and contacting the support.

18. The aircraft according to claim 12, wherein the locking assembly comprises a pin (316) that is lockable within a non-linear slot (314).

19. A method of increasing support of an aircraft system (102) or aircraft equipment (104), the method comprising:
providing a rotating component (106, 108);
supporting the rotating component via at least one support structure (200), wherein the support structure includes a locking assembly ($P_1$);
displacing the support structure (200) by a predetermined threshold amount; and
in response to displacing the support structure by the predetermined threshold amount, locking, automatically, an inner member (214) of the support with respect to an outer member (208) of the support via the locking assembly ($P_1$) for stiffening the support.

20. The method according to claim 19, wherein providing the rotating component (106, 108) comprises providing an aircraft engine, a turbofan, a fan, a turbine, or any other unbalance source.

21. The method according to claim 19, wherein providing the rotating component (106) comprises providing an aircraft engine, and wherein supporting the rotating component via at least one support structure comprises providing a plurality of support structures (200) between the aircraft engine and at least one piece of aircraft equipment (104).

22. The method according to claim 19, further comprising providing the locking assembly ($P_1$) within a housing (210) at one end of the support structure, the locking assembly comprising a locking member (218, 316) and at least one slot (220, 314).

23. The method according to claim 22, further comprising elastically deforming the locking member (218) in a radial direction until the locking member is received within the slot (220) to lock the inner member (214) of the support with respect to the outer member (208) of the support.

24. The method according to claim 22, further comprising rotating the support structure (200) to move the locking member (316) with respect to a non-linear slot (314) to lock the inner member (214) of the support with respect to the outer member (208) of the support.

\* \* \* \* \*